(12) United States Patent
Maki et al.

(10) Patent No.: US 8,834,778 B2
(45) Date of Patent: Sep. 16, 2014

(54) MOLD DELAY FOR INCREASED PRESSURE FOR FORMING CONTAINER

(75) Inventors: Kirk Edward Maki, Tecumseh, MI (US); George David Lisch, Jackson, MI (US)

(73) Assignee: Amcor Limited, Hawthorn (AU)

( * ) Notice: Subject to any disclaimer, the term of this patent is extended or adjusted under 35 U.S.C. 154(b) by 258 days.

(21) Appl. No.: 13/230,246

(22) Filed: Sep. 12, 2011

(65) Prior Publication Data

US 2012/0061884 A1 Mar. 15, 2012

Related U.S. Application Data

(60) Provisional application No. 61/382,123, filed on Sep. 13, 2010.

(51) Int. Cl.
| | | |
|---|---|---|
| *B29C 49/08* | (2006.01) | |
| *B29C 49/48* | (2006.01) | |
| *B29C 49/42* | (2006.01) | |
| *B29K 67/00* | (2006.01) | |
| *B29C 49/12* | (2006.01) | |
| *B29K 23/00* | (2006.01) | |

(52) U.S. Cl.
CPC ....... *B29C 49/4815* (2013.01); *B29K 2067/003* (2013.01); *B29C 49/4268* (2013.01); *B29C 49/12* (2013.01); *B29K 2023/04* (2013.01); *B29K 2023/10* (2013.01)
USPC ............................ 264/524; 264/529; 264/532

(58) Field of Classification Search
None
See application file for complete search history.

(56) References Cited

U.S. PATENT DOCUMENTS

| | | | |
|---|---|---|---|
| 3,267,185 | A | 8/1966 | Freeman, Jr. |
| 3,268,635 | A | 8/1966 | Kraus et al. |
| 3,993,427 | A | 11/1976 | Kauffman et al. |
| 4,039,641 | A | 8/1977 | Collins |
| 4,177,239 | A | 12/1979 | Gittner et al. |
| 4,321,938 | A | 3/1982 | Siller |
| 4,432,720 | A | 2/1984 | Wiatt et al. |
| 4,457,688 | A | 7/1984 | Calvert et al. |
| 4,490,327 | A | 12/1984 | Calvert et al. |

(Continued)

FOREIGN PATENT DOCUMENTS

| | | |
|---|---|---|
| EP | 1529620 | 5/2005 |
| EP | 1577258 | 9/2005 |

(Continued)

OTHER PUBLICATIONS

International Search Report and Written Opinion dated May 8, 2012 in corresponding International Patent Application No. PCT/US2011/054584 (six pages).

(Continued)

*Primary Examiner* — Monica Huson
(74) *Attorney, Agent, or Firm* — Harness, Dickey & Pierce, P.L.C.

(57) ABSTRACT

A method of fluid forming a container comprising positioning a plastic preform into a mold cavity, wherein the mold cavity defines a first configuration and a first volume. The method further includes injecting a fluid within the plastic preform at a first fluid pressure urging the plastic preform into an expanded shape. The method includes actuating the mold cavity into a second configuration and a second volume, whereby the second volume is smaller than the first volume, thereby resulting in a second fluid pressure within the plastic preform being greater than the first fluid pressure.

22 Claims, 2 Drawing Sheets

(56) References Cited

U.S. PATENT DOCUMENTS

Figure 1:
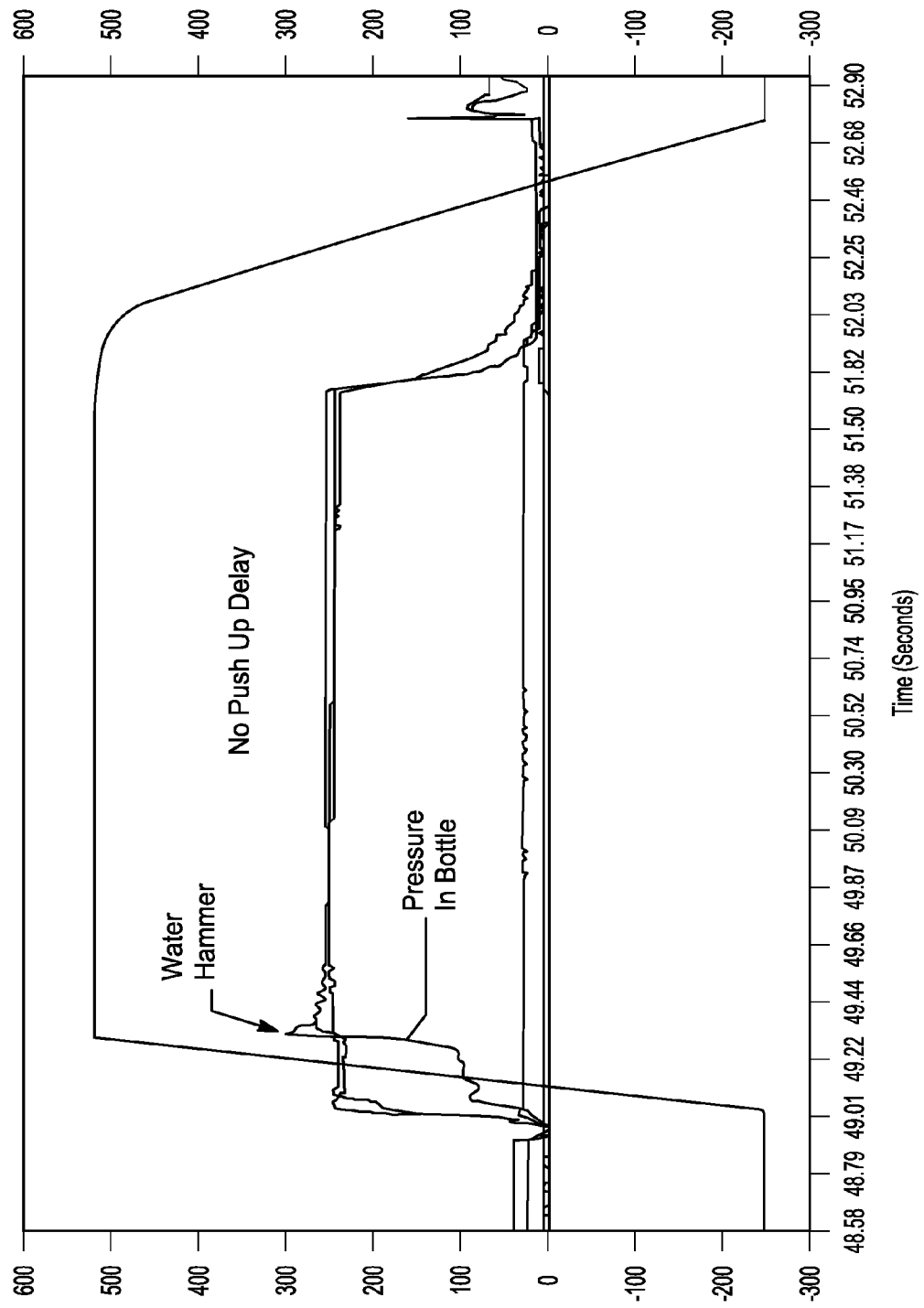

| | | | |
|---|---|---|---|
| 4,499,045 | A | 2/1985 | Obsomer |
| 4,539,172 | A | 9/1985 | Winchell et al. |
| 4,725,464 | A | 2/1988 | Collette |
| 4,883,631 | A | 11/1989 | Ajmera |
| 4,935,190 | A | 6/1990 | Tennerstedt |
| 5,129,815 | A | 7/1992 | Miyazawa et al. |
| 5,269,672 | A | 12/1993 | DiGangi, Jr. |
| 5,389,332 | A | 2/1995 | Amari et al. |
| 5,403,538 | A | 4/1995 | Maeda |
| 5,540,879 | A | 7/1996 | Orimoto et al. |
| 5,599,496 | A | 2/1997 | Krishnakumar et al. |
| 5,622,735 | A | 4/1997 | Krishnakumar et al. |
| 5,635,226 | A | 6/1997 | Koda et al. |
| 5,687,550 | A | 11/1997 | Hansen et al. |
| 5,824,237 | A | 10/1998 | Stumpf et al. |
| 5,962,039 | A | 10/1999 | Katou et al. |
| 6,214,282 | B1 | 4/2001 | Katou et al. |
| 6,277,321 | B1 | 8/2001 | Vailliencourt et al. |
| 6,485,670 | B1 | 11/2002 | Boyd et al. |
| 6,502,369 | B1 | 1/2003 | Andison et al. |
| 6,692,684 | B1 | 2/2004 | Nantin et al. |
| 6,729,868 | B1 | 5/2004 | Vogel et al. |
| 6,749,415 | B2 | 6/2004 | Boyd et al. |
| 6,767,197 | B2 | 7/2004 | Boyd et al. |
| 7,141,190 | B2 | 11/2006 | Hekal |
| 7,473,388 | B2 | 1/2009 | Desanaux et al. |
| 7,553,441 | B2 | 6/2009 | Shi |
| 7,914,726 | B2 | 3/2011 | Andison et al. |
| 7,981,356 | B2 | 7/2011 | Warner et al. |
| 8,017,064 | B2 | 9/2011 | Andison et al. |
| 8,096,483 | B2 | 1/2012 | Riney |
| 2001/0010145 | A1 | 8/2001 | Tawa et al. |
| 2005/0067002 | A1 | 3/2005 | Jones |
| 2005/0206045 | A1 | 9/2005 | Desanaux et al. |
| 2006/0097417 | A1 | 5/2006 | Emmer |
| 2006/0231646 | A1 | 10/2006 | Geary, Jr. |
| 2008/0047964 | A1* | 2/2008 | Denner et al. ................. 220/624 |
| 2008/0254160 | A1 | 10/2008 | Rousseau et al. |
| 2008/0271812 | A1 | 11/2008 | Stefanello et al. |
| 2009/0218733 | A1* | 9/2009 | Andison et al. ............... 264/525 |
| 2010/0084493 | A1 | 4/2010 | Troudt |
| 2010/0213629 | A1 | 8/2010 | Adriansens |
| 2010/0303946 | A1 | 12/2010 | Voth |
| 2011/0265433 | A1 | 11/2011 | Chauvin et al. |

FOREIGN PATENT DOCUMENTS

| | | |
|---|---|---|
| EP | 1688234 | 8/2006 |
| FR | 2887525 | 12/2006 |
| JP | 57123027 | 7/1982 |
| JP | 63-249616 | 10/1988 |
| JP | 09057834 | 3/1997 |
| JP | 09099477 | 4/1997 |
| JP | 10-217258 | 8/1998 |
| JP | 2000-043129 | 2/2000 |
| JP | 2005-254704 | 9/2005 |
| JP | 2005-529002 | 9/2009 |
| KR | 10-0147442 | 8/1998 |
| KR | 2006-0105883 | 10/2006 |
| KR | 10-2006-0128062 | 12/2006 |
| WO | WO02/24435 | 3/2002 |
| WO | WO03/095179 | 11/2003 |
| WO | WO2004/065105 | 8/2004 |
| WO | WO2005/044540 | 5/2005 |
| WO | WO2007/120807 | 10/2007 |

OTHER PUBLICATIONS

International Search Report and Written Opinion dated May 9, 2012 in corresponding International Patent Application No. PCT/US2011/056053 (six pages).

International Search Report and Written Opinion dated May 30, 2012 in corresponding International Patent Application No. PCT/US2011/056057 (six pages).

International Search Report and Written Opinion dated Jun. 15, 2012 in corresponding International Patent Application No. PCT/US2011/051293 (eight pages).

International Search Report and Written Opinion dated Oct. 29, 2012 in corresponding International Patent Application No. PCT/US2012/024950 (seven pages).

International Search Report and Written Opinion dated Apr. 18, 2012 in corresponding PCT International Patent Application No. PCT/US2011/051289 (nine pages).

International Search Report and Written Opinion dated Sep. 28, 2012 in corresponding International Patent Application No. PCT/US2012/024954 (six pages).

* cited by examiner

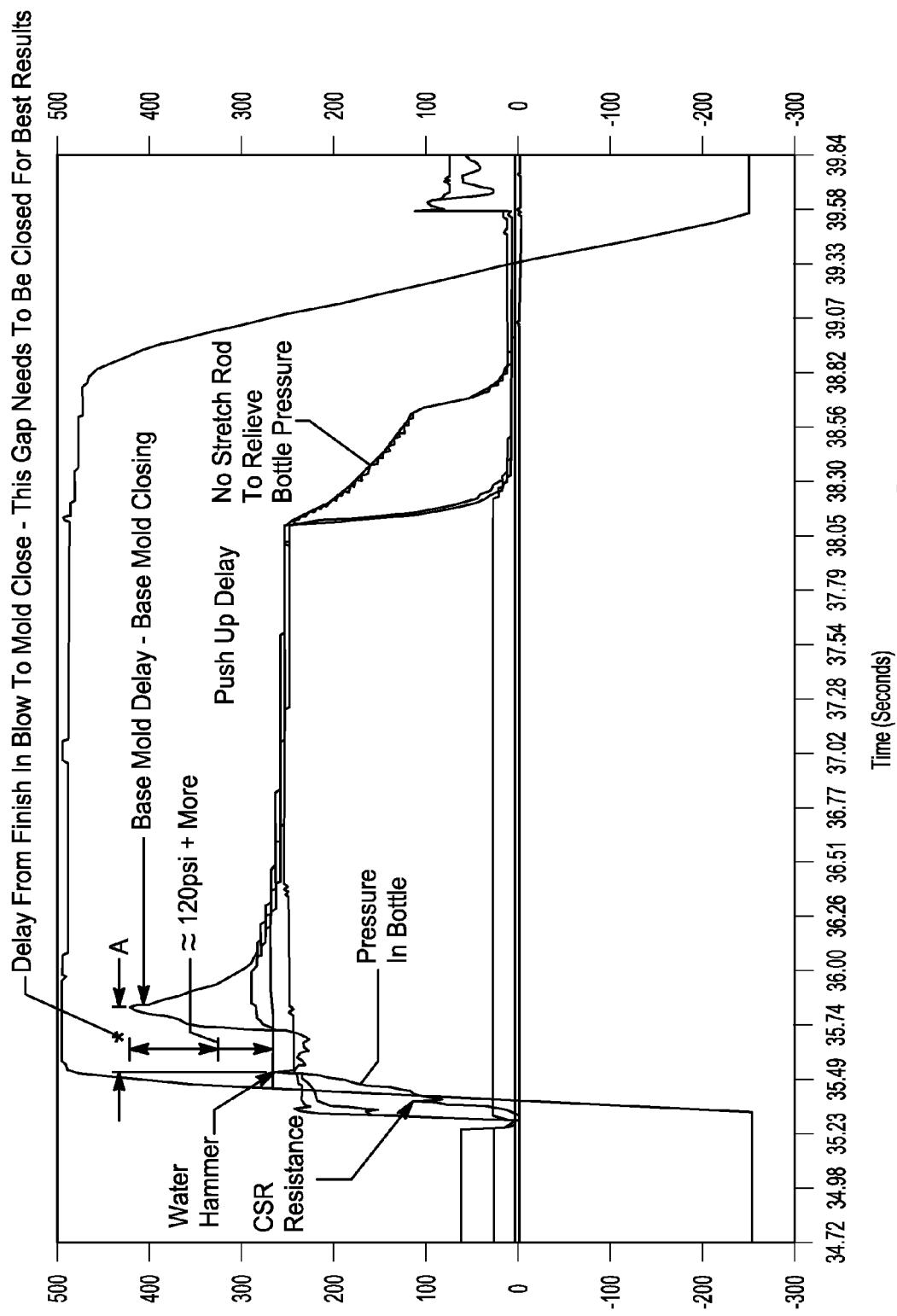

MOLD DELAY FOR INCREASED PRESSURE FOR FORMING CONTAINER

CROSS-REFERENCE TO RELATED APPLICATIONS

This application claims the benefit of U.S. Provisional Application No. 61/382,123, filed on Sep. 13, 2010. The entire disclosure of the above application is incorporated herein by reference.

FIELD

This disclosure generally relates to molds for filling containers with a commodity, such as a liquid commodity. More specifically, this disclosure relates to molds for filling blown polyethylene terephthalate (PET) containers and methods of using the same to increase pressure for forming containers.

BACKGROUND

This section provides background information related to the present disclosure which is not necessarily prior art.

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 25%-35%.

SUMMARY

This section provides a general summary of the disclosure, and is not a comprehensive disclosure of its full scope or all of its features.

According to the principles of the present disclosure, a method of fluid forming a container is provided. The method comprises positioning a plastic preform into a mold cavity, wherein the mold cavity defines a first configuration and a first volume. The method further includes injecting a fluid within the plastic preform at a first fluid pressure urging the plastic preform into an expanded shape. The method includes actuating the mold cavity into a second configuration and a second volume, whereby the second volume is smaller than the first volume, thereby resulting in a second fluid pressure within the plastic preform being greater than the first fluid pressure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a graph illustrating pressure versus time for a fluid pressure within a container being formed in a conventional manner; and FIG. 2 is a graph illustrating pressure versus time for a fluid pressure within a container being formed according to the principles of the present teachings.

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present teachings provide for a blow mold device and method of using the same to increase molding pressure for forming containers. The blow mold design and method of the present teachings, unlike conventional molds and methods, provides increased fluid pressure within the container being formed for improved manufacturing.

As will be discussed in greater detail herein, the shape of the mold of the present teachings and the container formed therewith can be formed according to any one of a number of variations. By way of non-limiting example, the mold of the present disclosure can be configured to hold any one or more of a plurality of containers and be used in connection with a number of fluids and commodities, such as beverages, food, or other hot-fill type materials, cold fill materials, aseptic, carbonated, or just air.

It should be appreciated that the size and the exact shape of the mold are dependent on the size of the container and the required operational parameters. Therefore, it should be recognized that variations can exist in the presently described designs. According to some embodiments, it should also be recognized that the mold can comprise various features for use with containers having vacuum absorbing features or regions, such as panels, ribs, slots, depressions, and the like.

The present teachings relate to the forming of one-piece plastic, e.g. polyethylene terephthalate (PET), PP, Polyethylene, or any other thermoplastic resin capable of being injection blow molded, containers. Generally, these containers, after formation, generally define a body that includes an upper portion having a cylindrical sidewall forming a finish. Integrally formed with the finish and extending downward therefrom is a shoulder portion. The shoulder portion merges into and provides a transition between the finish and a sidewall portion. The sidewall portion extends downward from the shoulder portion to a base portion having a base. An upper transition portion, in some embodiments, may be defined at a transition between the shoulder portion and the sidewall portion. A lower transition portion, in some embodiments, may be defined at a transition between the base portion and the sidewall portion.

The exemplary container may also have a neck. The neck may have an extremely short height, that is, becoming a short extension from the finish, or an elongated height, extending between the finish and the shoulder portion. The upper portion can define an opening. Although the container is shown as a drinking container and a food container, it should be appreciated that containers having different shapes, such as sidewalls and openings, can be made according to the principles of the present teachings.

The finish of the plastic container may include a threaded region having threads, a lower sealing ridge, and a support ring. The threaded region provides a means for attachment of a similarly threaded closure or cap (not illustrated). Alternatives may include other suitable devices that engage the finish of the plastic container, such as a press-fit or snap-fit cap, or a heat induction seal, or other means of closing the container for example. Accordingly, the closure or cap (not illustrated) engages the finish to preferably provide a hermetical seal of the plastic container. The closure or cap (not illustrated) is preferably of a plastic or metal material conventional to the closure industry and suitable for subsequent thermal processing or withstanding the pressures required by the commodity or process that the container is filled.

The container can be formed according to the principles of the present teachings. A preform version of container includes a support ring, which may be used to carry or orient the preform through and at various stages of manufacture. For example, the preform may be carried by the support ring, the support ring may be used to aid in positioning the preform in a mold cavity, or the support ring may be used to carry an intermediate container once molded. At the outset, the preform may be placed into the mold cavity such that the support ring is captured at an upper end of the mold cavity. In general, the mold cavity has an interior surface corresponding to a desired outer profile of the blown container. More specifically, the mold cavity according to the present teachings defines a body forming region, an optional moil forming region and an optional opening forming region. Once the resultant structure, hereinafter referred to as an intermediate container, has been formed, any moil created by the moil forming region may be severed and discarded. It should be appreciated that the use of a moil forming region and/or opening forming region are not necessarily in all forming methods.

In one example, a machine places the preform heated to a temperature between approximately 190° F. to 250° F. (approximately 88° C. to 121° C.) (for PET, other ranges for alternate materials in accordance with the chosen material) into the mold cavity. The mold cavity may be heated to a temperature between approximately 250° F. to 350° F. (approximately 121° C. to 177° C.) (or less or more depending on the resin, the process, and end product desired). In some embodiments, an internal stretch rod apparatus stretches or extends the heated preform within the mold cavity to a length approximately that of the intermediate container thereby molecularly orienting the polyester material in an axial direction generally corresponding with the central longitudinal axis of the container. While the stretch rod extends the preform, fluid having a pressure between 300 PSI to 600 PSI (2.07 MPa to 4.14 MPa) assists in extending the preform in the axial direction and in expanding the preform in a circumferential or hoop direction thereby substantially conforming the material to the shape of the mold cavity and further molecularly orienting the material in a direction generally perpendicular to the axial direction, thus establishing the biaxial molecular orientation of the material in most of the intermediate container. The pressurized air holds the mostly biaxial molecularly oriented material against the mold cavity for a period of approximately one (1) to five (5) seconds before removal of the intermediate container from the mold cavity. This process is known as heat setting and results in a heat-resistant container suitable for filling with a product at high temperatures.

In some embodiments, pressurized liquid can be injected into the preform to urge the preform into its final shape. To achieve a desired final shape, fluid pressure typically needs to be selected that is sufficiently high to urge the preform into all portions of the mold cavity. Conventionally, depending on the container to be formed and the difficulty of the desired shape, increased fluid pressure may be necessary. However, obtaining these increased fluid pressures may require costly upgrades in pumps and necessary machinery.

However, according to the principles of the present teachings, increased fluid pressure can be achieved through the mechanical actuation of the mold. That is, according to the principles of the present teachings, during a liquid filling and forming process, a portion of the mold, such as the base mechanism, can be retracted or otherwise extended away from the preform to provide increased internal mold cavity volume. As the container is formed, the pressure within the container begins to build in response to the fluid pressure of the forming fluid. As the inflation process of the container nears its end (potentially culminating in a pressure spike due to water hammer or hydraulic shock), the base mechanism or other mold portion can be actuated to decrease the volume of the mold cavity while simultaneously sealing the fluid from exiting the mold cavity. The volume displacement (i.e. reduction) of the mold cavity increases the pressure of the fluid within the container preform within the mold cavity as the mold moves from a retracted position to a compressed position. In this way, the fluid pressure within the container preform is mechanically increased through the reduced volume displacement of the mold cavity, thereby resulting in an internal fluid pressure within the mold cavity that is substantially higher than that which could be achieved simply through fluid pumping capacity. In other words, according to the principles of the present teachings, the fluid pumps used for pumping the fluid within the mold cavity can be reduced in size and cost without resulting in decreased fluid formation pressures. These fluid formation pressures are thus still achieved through the mechanical volume displacement of the mold cavity. The present teachings provide cost savings in equipment purchase without sacrificing forming pressures and capability.

As can be seen in the graphs of FIGS. 1 and 2, employing the principles of the present teachings and produce increased fluid pressure. By way of non-limiting example, it can be seen that the final fluid pressure according to the present teachings (FIG. 2) can be greater than about 120 psi compared to techniques not employing the push-up or overstroke technique. It should be noted, however, that in some embodiments it is desirable to minimize the time between the completion of the fluid injection and the initiation of the mold closure, generally indicated by the time difference A (FIG. 2). In some embodiments, it has been found that this time difference A can be less than about 2 seconds, and in some embodiments, as illustrated in FIG. 2 this time difference A can be less than about 0.3 seconds. Time difference A can, in some embodiments, be measured from the peak of a water hammer spike to a peak of a mold push-up or overstroke.

In some embodiments, it has been found that in order to achieve the desired increased fluid pressure within the preform or container, the movement of the base mechanism can be moved about 10 mm to about 15 mm. Although movement ranges above and below this stated range may be acceptable for various container designs, a 10 mm to 15 mm range for an exemplary 64 oz round container has achieve the benefits of the present teachings. In this regard, movement of the base mechanism has resulted in a volume reduction of about 0.14%. However, this volume reduction can range from about 0.1% to about 5%. In many instances, the movement distance and duration directly affects the quality of the resultant container. In some embodiments, the base mechanism is actuated before the base is fully formed and cooled, or unformable into the desired shape. This actuation occurs when the container is greater than 90% formed and less than 100%. In some embodiments, this operation results in a final pressure of about 40 bar or within the range of about 20 bar to about 80 bar. The time duration of movement of the base mechanism from the start of base mechanism actuation to completion can be within the range of about 0.02 to 0.2 seconds, or particularly about 0.075 seconds.

In some embodiments according to the present teachings, a method of fluid forming a container can comprise (a) positioning a plastic preform into a mold cavity, (b) closing and sealing the mold cavity (and blow nozzle) such that the mold cavity defines a first configuration and a first volume such that a base portion of the mold cavity is in a first position, (c) injecting a fluid within the plastic preform at a first fluid pressure urging the plastic preform into an expanded shape against the mold cavity; and (d) moving the base portion of the mold cavity into a compressed position thereby defining a second configuration and a second volume of the mold cavity. The second volume is smaller than the first volume resulting in a second fluid pressure within the plastic preform being greater than the first fluid pressure. In some embodiments, the step of moving the base portion of the mold cavity into the compressed position includes mechanically moving the base portion of the mold cavity into the compressed position to vary the mold cavity from the first volume to the second volume. In some embodiments, the step of moving the base portion of the mold cavity into the compressed position is performed after the step of injecting the fluid within the plastic preform at the first fluid pressure urging the plastic preform into the expanded shape against the mold cavity. In some embodiments, the step of moving the base portion of the mold cavity into the compressed position is performed at a predetermined time after injecting the fluid within the plastic preform. This predetermined time can be less than about 2 seconds or even less than about 0.3 seconds. In some embodiments, the second volume can be about 0.1% to 5% smaller than the first volume.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method of liquid forming a container, said method comprising:
    positioning a plastic preform into a mold cavity, said mold cavity defining a first configuration and a first volume;
    injecting a liquid within said plastic preform at a first liquid pressure urging said plastic preform into an expanded shape; and
    before the expanded shape is cooled, actuating said mold cavity into a second configuration and a second volume, said second volume being about 0.1% to 5% smaller than said first volume, thereby resulting in a second liquid pressure within said plastic preform greater than said first liquid pressure.

2. The method according to claim 1 wherein said actuating said mold cavity into said second configuration and said second volume comprises moving a base portion of said mold cavity from a retracted position to a compressed position to vary said mold cavity from said first volume to said second volume, said movement resulting in a compression force being applied to said plastic preform.

3. The method according to claim 1 wherein said actuating said mold cavity into said second configuration and said second volume comprises sealing said mold cavity to generally inhibit said liquid from flowing from said mold cavity and moving a base portion of said mold cavity from a retracted position to a compressed position to vary said mold cavity from said first volume to said second volume.

4. The method according to claim 1 wherein said actuating said mold cavity into said second configuration and said second volume comprises mechanically actuating a base portion of said mold cavity into a compressed position to vary said mold cavity from said first volume to said second volume.

5. The method according to claim 1 wherein said actuating said mold cavity into said second configuration and said second volume is performed after said injecting said liquid into said plastic preform at said first liquid pressure urging said plastic preform into said expanded shape.

6. The method according to claim 1 wherein said actuating said mold cavity into said second configuration and said second volume is a predetermined time after said injecting said liquid into said plastic preform at said first liquid pressure to achieve a predetermined liquid pressure spike.

7. The method according to claim 6 wherein said predetermined time is less than about 2 seconds.

8. The method according to claim 6 wherein said predetermined time is less than about 0.3 seconds.

9. The method according to claim 1 wherein said actuating said mold cavity into said second configuration and said second volume occurs within a time duration of about 0.02 seconds to about 0.2 seconds.

10. The method according to claim 1 wherein said actuating said mold cavity into said second configuration and said second volume occurs within a time duration of about 0.075 seconds.

11. The method according to claim 1 wherein said injecting a liquid within said plastic preform at said first liquid pressure urging said plastic preform into said expanded shape comprises injecting said liquid within said plastic preform at said first liquid pressure urging said plastic preform into said expanded shape having a volume less than 99% of a volume of said mold cavity.

12. The method according to claim 1 wherein said injecting a liquid within said plastic preform at said first liquid pressure urging said plastic preform into said expanded shape comprises injecting said liquid within said plastic preform at said first liquid pressure urging said plastic preform into said expanded shape having a volume greater than 90% and less than 99% of a volume of said mold cavity.

13. A method of liquid forming a container, said method comprising:
    positioning a plastic preform into a mold cavity;
    closing and sealing said mold cavity, said mold cavity defining a first configuration and a first volume such that a base portion of said mold cavity is in a first position;
    injecting a liquid within said plastic preform at a first liquid pressure urging said plastic preform into an expanded shape against said mold cavity; and
    before the expanded shape is cooled, moving said base portion of said mold cavity into a compressed position thereby defining a second configuration and a second volume of said mold cavity, said second volume being about 0.1% to 5% smaller than said first volume resulting in a second liquid pressure within said plastic preform being greater than said first liquid pressure.

14. The method according to claim 13 wherein said moving said base portion of said mold cavity into said compressed position comprises mechanically moving said base portion of said mold cavity into said compressed position to vary said mold cavity from said first volume to said second volume.

15. The method according to claim 13 wherein said moving said base portion of said mold cavity into said compressed position is performed after said injecting said liquid within said plastic preform at said first liquid pressure urging said plastic preform into said expanded shape against said mold cavity.

16. The method according to claim 13 wherein said moving said base portion of said mold cavity into said compressed position is a predetermined time after said injecting said liquid within said plastic preform at said first liquid pressure to achieve a predetermined liquid pressure spike.

17. The method according to claim 16 wherein said predetermined time is less than about 2 seconds.

18. The method according to claim 16 wherein said predetermined time is less than about 0.3 seconds.

19. The method according to claim 13 wherein said moving said base portion of said mold cavity into said compressed position occurs within a time duration of about 0.02 seconds to about 0.2 seconds.

20. The method according to claim 13 wherein said moving said base portion of said mold cavity into said compressed position occurs within a time duration of about 0.075 seconds.

21. The method according to claim 13 wherein said injecting a liquid within said plastic preform at said first liquid pressure urging said plastic preform into said expanded shape comprises injecting said liquid within said plastic preform at said first liquid pressure urging said plastic preform into said expanded shape having a volume less than 99% of a volume of said mold cavity.

22. The method according to claim 13 wherein said injecting a liquid within said plastic preform at said first liquid pressure urging said plastic preform into said expanded shape comprises injecting said liquid within said plastic preform at said first liquid pressure urging said plastic preform into said expanded shape having a volume greater than 90% and less than 99% of a volume of said mold cavity.

\* \* \* \* \*